United States Patent [19]

Lutz

[11] Patent Number: 5,017,406

[45] Date of Patent: May 21, 1991

[54] UV CURABLE COMPOSITIONS CURED WITH POLYSILANE AND PEROXIDE INITIATORS

[75] Inventor: Michael A. Lutz, Midland, Mich.

[73] Assignee: Dow Corning Corporation, Midland, Mich.

[21] Appl. No.: 281,359

[22] Filed: Dec. 8, 1988

[51] Int. Cl.⁵ .................. C08G 77/08; C08G 77/20
[52] U.S. Cl. ............................ 427/54.1; 522/6; 522/24; 522/99; 528/24
[58] Field of Search ............... 522/24, 28, 99, 6; 528/24; 427/54.1

[56] References Cited

U.S. PATENT DOCUMENTS

| | | | |
|---|---|---|---|
| 4,539,357 | 9/1985 | Bobear | 528/24 |
| 4,548,690 | 10/1985 | Peterson | 522/7 |
| 4,569,953 | 2/1986 | West et al. | 522/6 |
| 4,697,026 | 9/1987 | Lee et al. | 522/99 |
| 4,702,990 | 10/1987 | Tanaka et al. | 522/24 |
| 4,780,486 | 10/1988 | Lee et al. | 522/99 |
| 4,849,461 | 7/1989 | Lee et al. | 522/99 |

FOREIGN PATENT DOCUMENTS 58-049717 3/1983 Japan.

Primary Examiner—Marion E. McCamish
Assistant Examiner—Susan Berman
Attorney, Agent, or Firm—Roger H. Borrousch

[57] ABSTRACT

UV curable compositions suitable for use as potting and encapsulating compounds for electrical and electronic devices are provided. The compositions comprise: (a) a UV curable compound polymerizable by a free radical process and containing reactive unsaturated groups, (b) a polysilane photoinitiator, and (c) a peroxide photoinitiator. The use of the two photoinitiators enables one to get a more complete cure, both at the surface and deep into the coating.

11 Claims, No Drawings

UV CURABLE COMPOSITIONS CURED WITH POLYSILANE AND PEROXIDE INITIATORS

BACKGROUND OF THE INVENTION

Field of the Invention

UV curable compositions suitable for use as potting and encapsulating compounds for electrical and electronic devices are provided. The compositions provide more effective cure at both the surface and in deep section and comprise (a) a UV curable compound which polymerizes by a free radical process, and which contains reactive unsaturated groups, (b) a polysilane photoinitiator and (c) a peroxide compound photoinitiator.

BACKGROUND INFORMATION

Japanese patent No. 58,049,717 describes a UV curable composition comprising (a) a polyorganosiloxane, (b) a polysilane initiator, and (c) a sensitizer.

It has been found, however, that compositions with a polysilane as the sole initiator only induce a surface cure (e.g. up to a thickness of about 50 mil.). Moreover, to applicants knowledge, there is no known single initiator that is effective in inducing UV cure for coatings of the type described herein; coatings up to 180 mil or more.

SUMMARY OF THE INVENTION

Surprisingly, it has been found that a complete cure can be obtained by the use of two photoinitiators, one a polysilane and the other a peroxide. The compositions also comprise a UV curable compound polymerizable by a free radical process and having reactive unsaturated groups. Additional improvements can be obtained by incorporation of UV chromophores onto the peroxide molecule. In addition to improved photocure, the peroxide provides the capability to thermally cure shadow regions not exposed to ultraviolet radiation. The scope and a better understanding of the invention, however, will be apparent from the following detailed description of the invention.

DETAILED DESCRIPTION OF THE INVENTION

The UV curable compound includes any compound which polymerizes by a free radical process and which contains reactive unsaturated groups. The preferred compounds have carbon-carbon double bonds. A still more preferred composition contains at least a part and preferably consists essentially all of an alkenyl functional polysiloxane as the UV curable compound. Exemplary of suitable reactive unsaturated groups are: acrylics, methacrylics, styrenics, acrylamides, acrylonitriles, vinyl acetates, alkynes, and alkenes such as vinyl and allyl.

Exemplary of suitable UV curable compounds, which are well known to those skilled in the art, are: siloxanes having alkene reactive groups as illustrated by U.S. Pat. Nos. 4,064,027, 4,596,720 and 4,608,270; triorganosiloxane-endblocked polydiorganosiloxane fluids having mercaptoalkyl radicals; mercapto-olefins and a methylvinyl polysiloxane as illustrated by U.S. Pat. No. 4,052,529; organopolysiloxanes having acrylic functionality such as exemplified by GB No. 2 151 243 A, U.S. Pat. Nos. 4,697,026, and 4,563,539, methacrylate functional polymers; acetylenic functional polymers; acrylated polymers such as urethanes, epoxies, and acrylic esters; unsaturated polyesters such as polyvinylesters and polyvinyl acetals; vinyl endblocked butadiene and polyisoprene polymers and oligomers; and organopolysiloxanes containing acrylamidoalkyl functionality.

Typical polysilanes for use in the invention are disclosed in U.S. Pat. Nos., 4,260,780, 4,276,424, 4,314,956, 4,324,901, and JP No. 58: 049,717. They include linear and branched peralkyl polysilanes, such as Me(Me$_2$Si)$_x$Me and Me(PhMeSi)$_x$Me, cyclic peralkyl polysilanes such as (Me$_2$Si)$_x$ and (PhMeSi)$_x$, and polysilacycloalkanes, but is preferably a cyclosilane of the formula:

(RR'Si)$_x$ wherein R and R' are independently selected from aliphatic and aromatic radicals, and x is an integer of from 4 through 7. In the above formula, and elsewhere in the specification and claims, Me and Ph represent the methyl and phenyl radicals respectively.

Suitable aromatic radicals include aryl such as phenyl, naphthyl, and benzyl and may be substituted with alkyl and alkoxy groups of from 1 to 10 carbon atoms, and other substituents such as halogen, carboxylate and nitrogen containing groups. Suitable aliphatic radicals are alkyl groups which have from 1 to 10 carbon atoms, which can be substituted with halogen, such as methyl, ethyl, propyl, isopropyl, cyclohexyl, 3,3,3-trifluoropropyl, and tertiary butyl. The most preferred silane has the formula:

(Me$_2$Si)$_6$

The peroxide should be compatible in the composition and be activated by UV light to form free radicals. Only a minor but effective amount of peroxide, and silane is required. Generally, from about 0.1% to about 10% of each or preferably from 2% to 5% is employed of each.

Exemplary of suitable peroxides (to include peroxy compounds) are: dibenzoyl peroxide, cumene hydroperoxide, di-t-butyl peroxide, diacetyl peroxide, hydrogen peroxide, peroxydisulphates, and 2,2-bis(terbutylperoxy)-2,5-dimethylhexane.

While the thickness of the coating will depend upon the particular use, typical coatings will have a thickness of between about 2 mils and about 500 mils. Coatings can be applied to glass, metals, electrical and electronic devices and other conventional substrates by conventional techniques such as draw bar coating, and dip coating. The compositions can be cured by exposure to a dose of ultraviolet (UV) radiation by conventional equipment such as a broad spectrum wavelength ultraviolet source. The compositions may require high doses of UV radiation to cure in air but readily cure under an inert atmosphere such as nitrogen in the amount of as little as 200 millijoules per square centimeter and still heat cure in the shadow areas or dark areas, i.e., where the composition is not exposed to the ultraviolet radiation. As is well known in the art, shadow cure is beneficial in that it allows one to cure areas that are not easily cured by UV to obtain optimum cured physical properties. The temperature necessary to heat cure the compositions will depend upon the particular composition but will generally be between about 80° C. and about 150° C. Conventional heating equipment can be employed such as convection ovens and infrared cure reactors. It does not matter whether the composition is first subjected to UV radiation or first heated but it is preferred to subject it to UV radiation for ease of handling.

If desired, other compatible ingredients can be incorporated in the composition and are well known to those skilled in the art. Typical ingredients include reinforcing agents, thickeners, flow control additives, adhesion additives, and other conventional processing and performance aids.

All patents and other references referred to herein are incorporated by reference.

The following examples will serve to illustrate the invention. All parts and percentages in said examples and elsewhere in the specification and claims, are by weight unless otherwise indicated.

measured. In this manner a measure of the UV cure depth (no pressure reading) and also the cure effectiveness (pressure reading) was obtained. The larger either reading, the better the UV cure.

Thermal cure response was measured by placing 5 g of the composition into an aluminum weighing dish or placing 1 g of the composition into a small capped vial, followed by thermal aging in a forced air oven for 1 hour at 128° C.

Table I shows the results of both heat curing and subjecting several compositions to UV radiation. Of the seven compositions, only the last is a composition of the invention (B+C), and it can be seen that it was the only composition to cure both on the surface and to the bottom.

TABLE I

| Photosensitization System | | Heat$^a$ Cure | UV Cure Response$^b$ | | | |
|---|---|---|---|---|---|---|
| Type | Amount (pph) | | 1 Min | 2 Min | 4 Min | Surface |
| *A | 4 | N/N | Gel | Gel | 15/3 | Cured |
| *B | 4 | N/Y | 160$^c$/91 | 160$^c$/141 | 160$^c$/152 | Fluid |
| *B | 8 | N/Y | 160$^c$/118 | 160$^c$/142 | 160$^c$/154 | Fluid |
| *C | 1 | N/N | 40/6 | 45/7 | 55/8 | Cured |
| *A + B | 1 + 8 | N/Y | Gel | Gel | 90/7 | Cured |
| *A + C | 8 + 1 | N/N | Gel | Gel | Gel | Cured |
| B + C | 8 + 1 | Y/Y | 160$^c$/27 | 160$^c$/104 | 160$^c$/149 | Cured | pph = Parts of additive per 100 parts UV curable compound
$^a$First letter open container (weighing dish), second closed (capped vial), cured 1 hr @ 128° C. N = No cure, Y = Yes cured.
$^b$Depth of cure in mils. First value no pressure. Second value squeezed between caliper.
$^c$Cured to bottom of container. (160 mils)
A = 2-Hydroxy-2-methyl-phenylpropan-1-one
B = Di-t-butyl peroxide
C = Dodecamethylcyclohexasilane
*Included for purposes of comparison

EXAMPLE 1

Employing a UV curable polysiloxane of the average structural formula $$[(MeSiO_{3/2})_3(Me_2SiO)_{95}(Me_3SiO_{\frac{1}{2}})_{1.3}(ViMe_2SiO_{\frac{1}{2}})_{0.7}]$$

wherein Me is methyl, and Vi is vinyl, various compositions were prepared as shown in the following table. The compositions were prepared by making a physical blend of the desired ingredients in a vial. The compositions were prepared using 20 g portions of the UV curable polysiloxane. To the 20 g portions was added the desired amount of photosensitization system. Compositions containing (Me$_2$Si)$_6$ were prepared by first adding it to the UV curable polysiloxane, heating for several minutes at 80° C. to aid disolution, cooling and then adding the remainder of the photosensitization system.

UV cure was obtained by placing a 10 g portion of the composition in an aluminum weighing dish (approx. 2" in diameter) and irridating with an ultraviolet cure unit (Ashdee UV-12H/2 Horizontal Cure Reactor manufactured by Ashdee Products, Koch Technical Division) which contained two median pressure Hg vapor arc lamps. The conveyor speed was 33 ft/min and both lamps were on the high setting. This resulted in an irradiation time of 3.65 sec. and a dose of 112 mJ/cm$^2$ for each pass. The cure dose was obtained using a UV Powermeter equipped with a 365 nm filter manufactured by Optical Associates, Inc. Time was allotted for samples to cool between passes. The appearance at the surface of the composition, whether fluid or cured, was then noted. Next, the cured thickness was measured with a hand held caliper manufactured by B. C. Ames Company, Waitham, Mass. The cured thickness was first measured without releasing the pressure foot. The pressure foot was then released and a second thickness

EXAMPLE 2

The above procedure was repeated employing a vinyl functional polymer of the average structural formula $$ViMe_2SiO(Me_2SiO)_{145}(ViMeSiO)_3SiMe_2Vi.$$

The other ingredients were the same and the results are shown in Table II. Of the six compositions, only the last (B+C) is a composition of this invention.

TABLE II

| Photosensitization System | | UV Cure Response$^b$ | |
|---|---|---|---|
| Type | Amount (pph) | 4 Min | Surface |
| *A | 2 | 55/32 | Cured |
| *B | 2 | 160$^c$/94 | Fluid |
| *B | 4 | 160$^c$/152 | Fluid |
| *C | 2 | 40/15 | Cured |
| *A + C | 2 + 2 | 65/24 | Cured |
| B + C | 8 + 1 | 160$^c$/154 | Cured |

$^c$cured to bottom of container (160 mils)
$^b$as defined in Table I
*Included for purposes of comparison From the data reported in the tables, it can be seen that only the compositions with the dual photoinitiators of this invention provide both a surface cure and a deep cure. Similar results are found with the other materials of the invention described, and they can be both shadow cured and heat cured.

The above disclosure contains the Best Mode and describes a number of materials which can be employed. Nevertheless, obvious modifications may appear to one of ordinary skill and thus the invention is intended to be limited only by the appended claims.

That which is claimed is:

1. An improved composition comprising (a) a UV curable compound polymerizable by a free radical process and containing reactive unsaturated groups selected from the group consisting of acrylics, methacrylics, styrenics, acrylamides, acrylonitriles, vinyl acetates, alkynes, and alkenes, (b) a polysilane photoinitiator selected from the group consisting of $(RR'Si)_x$, $Me(Me_2Si)_x$, and $Me(PhMeSi)_xMe$ in which R and R' are independently selected from aliphatic and aromatic radicals, x is an integer of from 4 to 7, Me is methyl, and Ph is phenyl, and (c) a peroxide photoinitiator selected from the group consisting of dibenzoyl peroxide, cumene hydroperoxide, di-t-butyl peroxide, diacetyl peroxide, hydrogen peroxide, peroxydisulfates, and 2,2-bis(terbutylperoxy)-2,5-dimethylhexane.

2. The composition of claim 1 wherein the UV curable compound is a vinyl functional polysiloxane.

3. The composition of claim 2, wherein the vinyl functional polysiloxane has the average structural formula

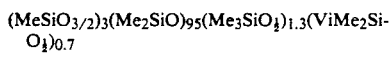

in which formula Me and Vi represent methyl and vinyl radicals, respectively.

4. The composition of claim 2, wherein the vinyl functional polysiloxane has the average structural formula $ViMe_2SiO(Me_2SiO)_{145}(ViMeSiO)_3SiMe_2Vi$ in which formula Me and Vi represent methyl and vinyl radicals, respectively.

5. The composition of claim 1, wherein the polysilane comprises a polysilane of the structure, $(RR'Si)_x$ wherein R and R' are independently selected from aliphatic and aromatic radicals, and x is an integer of from 4 through 7.

6. The composition of claim 5, wherein the polysilane consists essentially of $(Me_2Si)_6$, and Me represents the methyl radical.

7. The composition of claim 2, wherein the polysilane comprises a polysilane of the structure, $(RR'Si)_x$ wherein R and R' are independently selected from aliphatic and aromatic radicals, and x is an integer of from 4 through 7.

8. The composition of claim 7, wherein the polysilane consists essentially of $(Me_2Si)_6$, and Me represents the methyl radical.

9. A method of coating a substrate which comprises applying to said substrate, a composition comprising (a) a UV curable compound polymerizable by a free radical process and containing reactive unsaturated groups selected from the group consisting of acrylics, methacrylics, styrenics, acrylamides, acrylonitriles, vinyl acetates, alkynes, and alkenes, (b) a polysilane photoinitiator selected from the group consisting of $(RR'Si)_x$, $Me(Me_2Si)_x$, and $Me(PhMeSi)_xMe$ in which R and R' are independently selected from aliphatic and aromatic radicals, x is an integer of from 4 to 7, Me is methyl, and Ph is phenyl, and (c) a peroxide photoinitiator selected from the group consisting of dibenzoyl peroxide, cumene hydroperoxide, di-t-butyl peroxide, diacetyl peroxide, hydrogen peroxide, peroxydisulfates, and 2,2-bis(terbutylperoxy)-2,5-dimethylhexane, and curing said composition with UV radiation.

10. The method of claim 9, wherein the substrate coated is an electrical or electronic device.

11. The method of claim 9, wherein the composition is also cured with heat.